United States Patent
Okubo

(10) Patent No.: US 8,736,213 B2
(45) Date of Patent: May 27, 2014

(54) MOTOR POSITION CONTROLLER

(75) Inventor: Tadashi Okubo, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 371 days.

(21) Appl. No.: 13/090,255

(22) Filed: Apr. 20, 2011

(65) Prior Publication Data

US 2011/0298407 A1 Dec. 8, 2011

(30) Foreign Application Priority Data

Jun. 7, 2010 (JP) ................................ 2010-129649

(51) Int. Cl.
*H02P 1/04* (2006.01)
(52) U.S. Cl.
USPC ........................................... 318/461; 318/798
(58) Field of Classification Search
USPC .................... 318/798, 799, 461, 727
See application file for complete search history.

(56) References Cited

U.S. PATENT DOCUMENTS 4,754,208 A * 6/1988 Nakajima et al. ............. 318/574
2008/0088282 A1 4/2008 Inokuchi et al.
2011/0079157 A1* 4/2011 Cote et al. ...................... 101/216

FOREIGN PATENT DOCUMENTS

| JP | 06-261574 | 9/1994 |
| JP | 11-139224 | 5/1999 |
| JP | 2008-99525 | 4/2008 |
| JP | 2008-154414 | 7/2008 |

OTHER PUBLICATIONS

Japanese Office Action for corresponding JP Application No. 2010-129649, Jun. 14, 2011.

* cited by examiner

*Primary Examiner* — Rina Duda
(74) *Attorney, Agent, or Firm* — Ditthavong Mori & Steiner, P.C.

(57) ABSTRACT

The motor position controller inputs a command pulse signal and a desired pulse form setting, and drives a motor based on the command pulse signal. The motor position controller includes a position command generating device configured to generate a position command signal from the command pulse signal in accordance with the inputted desired pulse form setting, a motor controlling part configured to supply power to the motor based on the position command signal, and a first conformity determination device configured to determine the conformity of the desired pulse form setting and the command pulse signal.

13 Claims, 7 Drawing Sheets

FIG. 2

| PULSE FORM | FORWARD ROTATION COMMAND PULSE SIGNAL | | REVERSE ROTATION COMMAND PULSE SIGNAL | |
|---|---|---|---|---|
| SIGN + PULSE TRAIN (POSITIVE LOGIC) | PULSE TRAIN | ⎍⎍⎍ | PULSE TRAIN | ⎍⎍⎍ |
| | SIGN | ⎍ | SIGN | ⎭ |
| CW + CCW PULSE TRAIN (POSITIVE LOGIC) | CW PULSE TRAIN | ⎭ | CW PULSE TRAIN | ⎍⎍⎍ |
| | CCW PULSE TRAIN | ⎍⎍⎍ | CCW PULSE TRAIN | ⎭ |
| TWO-PHASE PULSE TRAIN WITH 90° PHASE DIFFERENTIAL | PHASE A | ⎍⎍⎍ | PHASE A | ⎍⎍⎍ |
| | PHASE B | ⎍⎍⎍ | PHASE B | ⎍⎍⎍ |

FIG. 3

| PULSE FORM SETTING | FEATURES | CONDITIONS FOR NONCONFORMITY DETECTION | ESTIMATED STATE OF NONCONFORMITY WHEN CONDITION IS SATISFIED |
|---|---|---|---|
| SIGN + PULSE TRAIN | THE SIGN NEVER CHANGES ALONE | ONLY "SIGN" CHANGES; THE "PULSE TRAIN" SIGNAL DOES NOT | INPUT OF "CW + CCW PULSE TRAIN" COMMAND |
| | | | REVERSE WIRING ERROR WITH "SIGN + PULSE TRAIN" |
| | THE SIGN NEVER CHANGES ON A PER PULSE BASIS | "SIGN" CHANGE CYCLE < "PULSE TRAIN" CHANGE CYCLE | INPUT OF "PHASE A + PHASE B" COMMAND |
| | THE CHANGE CYCLE OF THE SIGN IS NOT VERY FAST | "SIGN" CHANGE CYCLE < THRESHOLD | INPUT OF "CW + CCW PULSE TRAIN" COMMAND |
| | | | INPUT OF "PHASE A + PHASE B" COMMAND |
| | | | REVERSE WIRING ERROR WITH "SIGN + PULSE TRAIN" |
| CW + CCW PULSE TRAIN | THE COUNTER CHANGES WHEN A PULSE TRAIN IS INPUTTED | THE COUNTER IS 0 EVEN THOUGH THE "PULSE TRAIN" AND "SIGN" CHANGED | INPUT OF "PHASE A + PHASE B" COMMAND |
| | CW AND CCW PULSE TRAIN NEVER CHANGE SIMULTANEOUSLY | BOTH "CW" AND "CCW" PULSE TRAIN CHANGED, BUT THE CHANGE CYCLE IS THE SAME | INPUT OF "PHASE A + PHASE B" COMMAND |
| | THE COUNTER CHANGES WHEN CW AND CCW PULSE TRAIN ARE INPUTTED | THE COUNTER IS 0 EVEN THOUGH "CW" AND "CCW" PULSE TRAIN" CHANGED | WRONG "CW + CCW PULSE TRAIN" LOGIC |
| TWO-PHASE PULSE TRAIN WITH 90° PHASE DIFFERENTIAL (PHASE A + PHASE B) | BOTH PHASE A AND PHASE B CHANGE | ONLY ONE CHANGED | INPUT OF "SIGN + PULSE TRAIN" COMMAND |
| | | | INPUT OF "CW + CCW PULSE TRAIN" COMMAND |
| | THE COUNTER CHANGES WHEN PHASE A AND PHASE B ARE INPUTTED WITH 90° PHASE DIFFERENTIAL | THE COUNTER IS 0 EVEN THOUGH "PHASE A" AND "PHASE B" CHANGED | INPUT OF "SIGN + PULSE TRAIN" COMMAND |
| | | | INPUT OF "CW + CCW PULSE TRAIN" COMMAND |

FIG. 6

| PULSE FORM SETTING | | | PULSE FORM ACTUALLY INPUTTED | | | | |
|---|---|---|---|---|---|---|---|
| | | | SIGN + PULSE TRAIN | | CW + CCW PULSE TRAIN | | TWO-PHASE PULSE TRAIN WITH 90° PHASE DIFFERENTIAL |
| | | | POSITIVE LOGIC | NEGATIVE LOGIC | POSITIVE LOGIC | NEGATIVE LOGIC | |
| SIGN + PULSE TRAIN | POSITIVE LOGIC | | NORMAL FORWARD ROTATION AND REVERSE ROTATION | FORWARD ROTATION AND REVERSE ROTATION ARE REVERSED | PARTIAL OPERATION | PARTIAL OPERATION | NORMAL FORWARD ROTATION AND REVERSE ROTATION |
| CW + CCW PULSE TRAIN | POSITIVE LOGIC | | PARTIAL OPERATION | PARTIAL OPERATION | NORMAL FORWARD ROTATION AND REVERSE ROTATION | DOES NOT OPERATE | NORMAL FORWARD ROTATION AND REVERSE ROTATION |
| TWO-PHASE PULSE TRAIN WITH 90° PHASE DIFFERENTIAL | | | DOES NOT OPERATE | DOES NOT OPERATE | DOES NOT OPERATE | DOES NOT OPERATE | NORMAL FORWARD ROTATION AND REVERSE ROTATION |

MOTOR POSITION CONTROLLER

CROSS-REFERENCE TO RELATED APPLICATION

The present application claims priority from Japanese Patent Application No. 2010-129649, which was filed on Jun. 7, 2010, the disclosure of which is incorporated herein by reference in its entirety.

BACKGROUND OF THE INVENTION

1. Field of the Invention

The present embodiment disclosed relates to a motor position controller configured to input a command pulse signal that serves as a position control command.

2. Description of the Related Art

Prior arts for providing to an inverter apparatus a program configured to continually monitor operation commands, operation procedure commands, and inoperable conditions and using this program to simply and quickly investigate the cause of an inoperable state are known (refer to JP, A, 2008-154414, for example). In addition, techniques for calculating a rate of change per unit time of a speed command, determining a result that is greater than a predetermined value as a fault, and then correcting the speed command accordingly have been known as means for detecting command pulse signal disconnection (refer to JP, A, 06-261574, for example).

SUMMARY OF THE INVENTION

According to the first aspect of the present invention, there is provided a motor position controller that inputs a command pulse signal and a desired pulse form setting, and drives a motor based on the command pulse signal, comprising: a position command generating device configured to generate a position command signal from the command pulse signal in accordance with the inputted desired pulse form setting; a motor controlling part configured to supply power to the motor based on the position command signal; and a first conformity determination device configured to determine the conformity of the desired pulse form setting and the command pulse signal.

According to the first aspect of the present invention, a change stroke of the command pulse signals inputted from an external source to the position command generating device for commanding a motor operation, that is, a setting of an arbitrary pulse form of the command pulse signals, is inputted to the position command generating device by the higher controller or user. This pulse form exists in a plurality of types. The pulse forms of a plurality of types are substantially incompatible with each other, and the type of pulse form of the command pulse signals actually inputted is indicated by the pulse form setting. The position command generating device generates a position command signal in accordance with the desired pulse form setting inputted at that moment.

At this time, the possibility exists that a pulse form related nonconformity may occur, i.e., the pulse form of the command pulse signals actually inputted may differ from the pulse form setting or the command pulse signals may not be properly transmitted, due to some kind of cause outside the motor position controller. This may result in difficulties in achieving normal motor operation or in an inoperative state.

In response, according to the first aspect of the present invention, the first conformity determination device determines the conformity of the command pulse signals and pulse form setting. With this arrangement, it is possible to specifically identify the nonconformity, such as a mismatch between the pulse form setting and the pulse form of the command pulse signals actually inputted, or transmission failure of the command pulse signals, making it possible to take appropriate action in accordance with the contents of that nonconformity.

As a result, motor operation defects caused by pulse form nonconformities can be avoided and reliable normal motor operation can be achieved.

According to the seventh aspect of the present invention, there is provided a motor position controller that drives a motor based on an input of a command pulse signal and a setting of a desired pulse form, comprising: a temporary setting portion configured to consecutively temporarily set a plurality of the pulse form settings following a predetermined order; a position command generating device configured to generate a position command signal from the command pulse signal in accordance with the desired pulse form setting; a motor controlling part configured to supply power to the motor based on the position command signal; and a second conformity determination portion configured to input the command pulse signal, input the pulse form setting temporarily set by the temporary setting portion, and to determine the conformity of the command pulse signal and the temporarily set pulse form setting.

According to the seventh aspect of the present invention, the temporary setting portion switches and temporarily sets a plurality of pulse forms consecutively. The position command generating device generates a position command signal in accordance with the pulse form setting temporarily set at that moment. That is, the motor position controller itself automatically executes trial runs with a plurality of pulse forms without depending on an external input. Then, at that time, the second conformity determination portion consecutively determines the conformity of the temporarily set plurality of pulse forms and the command pulse signals actually inputted. With this arrangement, it is possible to estimate the pulse form of the command pulse signals actually inputted in accordance with the determination results. As a result, motor operation defects caused by pulse form nonconformities can be avoided and reliable normal motor operation can be achieved.

According to the 14th aspect of the present invention, there is provided a motor position controller that inputs a command pulse signal and a desired pulse form setting, and drives a motor based on the command pulse signal, comprising: position command generating means configured to generate a position command signal from the command pulse signal in accordance with the inputted desired pulse form setting; motor controlling means configured to supply power to the motor based on the position command signal; and first conformity determination means configured to determine the conformity of the desired pulse form setting and the command pulse signal.

BRIEF DESCRIPTION OF THE DRAWINGS

FIG. 2 is a table explaining the three types of pulse forms of "sign+pulse train," "CW+CCW pulse train," and "two-phase pulse train with 90° phase differential."

FIG. 3 is a table summarizing the nonconformities that may occur taking into consideration the respective features of the three types of pulse forms.

FIG. 6 is a table summarizing the differences in operation phenomena when the pulse form of the two command pulse signals actually inputted is changed with respect to a pulse form temporarily set.

DETAILED DESCRIPTION OF THE EMBODIMENTS

The following describes an embodiment of the present aspect of the invention with reference to accompanying drawings.

Figure 1:
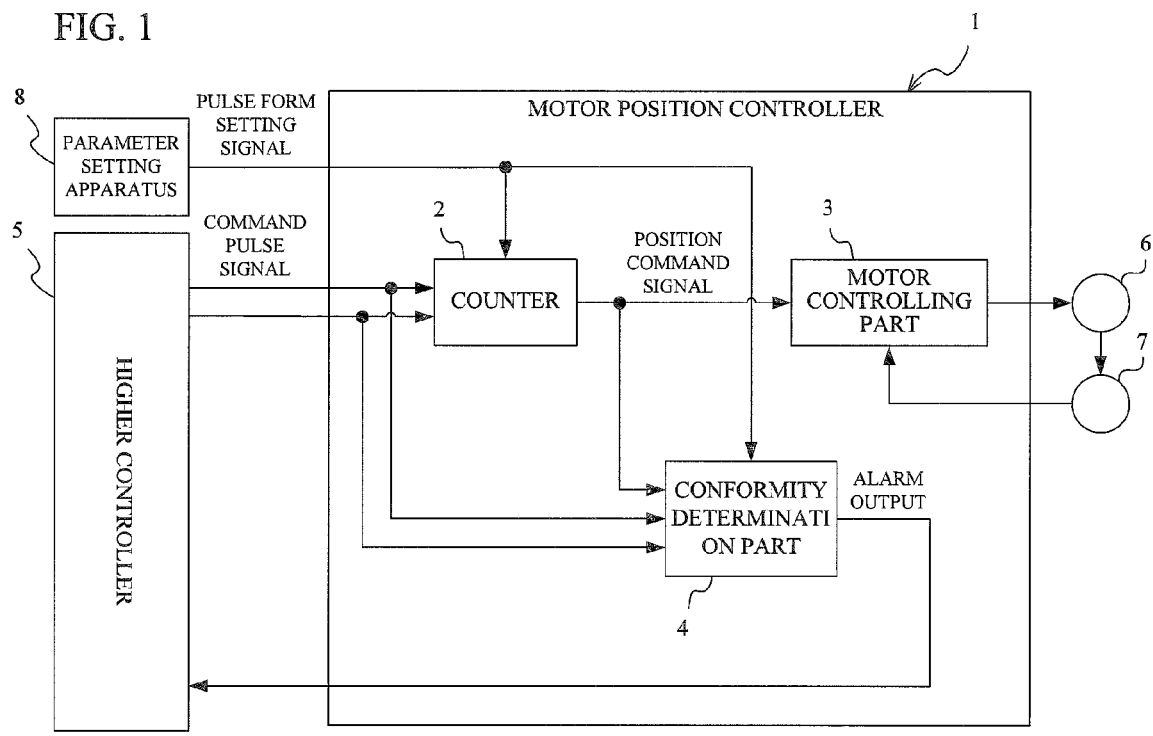
FIG. 1 is a system block diagram schematically showing the system configuration of the motor position controller and peripheral devices thereof according to the embodiment.

FIG. 1 is a system block diagram schematically showing the system configuration of the motor position controller and peripheral devices thereof according to an embodiment of the present aspect of the invention. In this embodiment, an example in which a rotary motor is driven and controlled is described. In FIG. 1, a motor position controller 1 comprises a counter 2, a motor controlling part 3, and a conformity determining part 4.

A higher controller 5 is provided outside the motor position controller 1, and comprises a personal computer, a controller, or the like, for example.

The counter 2 receives command pulse signal inputs from the higher controller 5, and generates and outputs to the motor controlling part 3 a position command signal corresponding to the number of pulses included in the command pulse signals. Note that this position command signal generating function of the counter 2 constitutes the position command generating device or the position command generating means described in the claims. The pulse form of the inputted command pulse signals exists in a plurality of formats of different change strokes, that is, a plurality of forms (refer to FIG. 2 described later). Specifically, the pulse form exists in the three types of pulse forms of "sign+pulse train," "CW+CCW pulse train," and "two-phase pulse train with 90° phase differential," with each comprising two command pulse signals (a first pulse signal and a second pulse signal). The counter 2 is capable of supporting all three types of pulse forms.

Further, according to this embodiment, a pulse form setting signal that clearly indicates the pulse form of the command pulse signals inputted to the counter 2 is inputted based on a manual setting of a user, for example, to the counter 2 via a parameter setting apparatus 8, which differs from the higher controller 5, prior to the actual operation of a motor 6. The counter 2 internally sets the pulse form by which the command pulse signals are to be interrupted as a pulse form setting, based on the inputted pulse form setting signal. As a result, the counter 2 counts the number of pulses included in the command pulse signals by applying the above-described internally set pulse form setting to the aforementioned inputted command pulse signal and interpreting the results, and then generates and outputs the above-described position command signal corresponding to the count contents to the motor controlling part 3. Note that this counter 2 is specifically often made of hardware circuitry, but may be made of software executed by a CPU (not particularly shown) or the like.

The motor controlling part 3 drives and controls the rotary motor 6 of this example, which is provided outside the motor position controller 1, based on information including rotational direction, rotational speed, and rotational position (rotation value) included in the position command signal inputted from the above-described counter 2. At this time, the motor controlling part 3 also acquires information such as the amount of motor rotation and the motor rotating direction from a rotary encoder 7, for example, mechanically connected to the motor 6, and performs feedback control of the motor 6.

The conformity determining part 4 receives the above-described command pulse signals, position command signal, and pulse form setting signal as inputs, and determines the conformity between the contents of the pulse form setting signal, i.e., the pulse form setting inside the counter 2, and the command pulse signals. Specifically, the conformity determining part 4 determines whether or not a pulse form related nonconformity exists, such as a mismatch between the pulse form setting of the counter 2 and the pulse form of the command pulse signals actually inputted, or transmission failure of the command pulse signals due to disconnection, a wiring connection error, or the like, while referring to the position command signal (this determination method will be described in detail later). Then, upon determination that a pulse form related nonconformity such as described above has occurred, the conformity determining part 4 outputs an alarm to the higher controller 5. With this arrangement, the higher controller 5 outputs a control signal to suitable alerting portion (not shown), enabling the alerting portion to alert the user accordingly. Note that the conformity determining part 4 may output an alarm to alerting portion provided inside the motor position controller 1, and the alerting portion may alert the user accordingly. This conformity determining part 4 is, for example, made of software executed by a CPU, etc. Then, this conformity determining part 4 functions as the first conformity determination portion or the first conformity determination means described in the claims.

As described above, the above-described counter 2 is capable of supporting all three types of pulse forms that include "sign+pulse train," "CW+CCW pulse train," and "two-phase pulse train with 90° phase differential." The following consecutively describes these three types of pulse forms.

FIG. 2 is a table explaining the three types of pulse forms of "sign+pulse train," "CW+CCW pulse train," and "two-phase pulse train with 90° phase differential."

First, according to the "sign+pulse train" pulse form, one of the two command pulse signals (lower in the figure) specified in advance functions as a sign signal that determines the rotational direction of the motor 6, and the other command pulse signal (upper in the figure) functions as a pulse train signal that determines the rotation value and the rotational speed of the motor 6. In the example shown, the pulse form commands that the motor 6 be rotated in the forward direction when a pulse is outputted to the pulse train signal while the sign signal is at a high level (=forward command pulse signal), and commands that the motor 6 be rotated in the reverse direction when a pulse is outputted to the pulse train signal while the sign signal is at a low level (=reverse command pulse signal). Then, the number of pulses effectively counted in the pulse train signal (hereinafter "counter summed value") functions as information used for commanding the number of revolutions of the motor 6 in each of the rotational directions, and the pulse frequency (or cycle) functions as information used for commanding the rotational speed of the motor 6.

Further, according to the "CW+CCW pulse train" pulse form, one of the two command pulse signals (lower in the figure) specified in advance functions as a CCW signal that determines the rotation value and rotational speed in the forward direction of the motor 6, and the other command pulse signal (upper in the figure) functions as a CW signal that determines the rotation value and the rotational speed in the reverse direction of the motor 6. In the example shown, the pulse form commands that the motor 6 be rotated in the forward direction when a pulse is outputted to the CCW signal while the CW signal is continually at a low level (=forward command pulse signal), and commands that the motor 6 be rotated in the reverse direction when a pulse is outputted to the CW signal while the CCW signal is continuously at a low level (=reverse command pulse signal). Then, the counter summed value effectively counted in the CCW signal during forward rotation or the CW signal during reverse rotation functions as information used for commanding the number of revolutions of the motor 6 in each of the rotational directions, and the pulse frequency (or cycle) functions as information used for commanding the rotational speed of the motor 6.

Further, according to the above-described "two-phase pulse train with 90° phase differential" pulse form, the two command pulse signals respectively specified as a phase A signal (upper in the figure) and a phase B signal (lower in the figure) in advance are pulse signals of the same waveform having a 90° phase difference, with the form of the phase difference determining the rotational direction of the motor 6 and the number of pulses determining the rotation value and the rotational speed of the motor 6. In the example shown, the pulse form commands that the motor 6 be rotated in the forward direction when the phase B signal is faster than the phase A signal by a phase of 90°, and conversely commands that the motor 6 be rotated in the reverse direction when the phase A signal is faster than the phase B signal by a phase of 90°. Then, the counter summed value effectively counted in the phase A signal and phase B signal (same value for both phases) functions as information used for commanding the number of revolutions of the motor 6 in each of the rotational directions, and the pulse frequency (or cycle) functions as information used for commanding the rotational speed of the motor 6.

Furthermore, there are two types of each of the above-described two "sign+pulse train" and "CW+CCW pulse train" pulse forms based on differences in the specification format of the rotational direction: a positive logic type and a negative logic type. FIG. 2 shows as examples the positive logic types of the two pulse forms "sign+pulse train" and "CW+CCW pulse train." Although not shown in the table, according to the negative logic type of the "sign+pulse train" pulse form, the pulse form commands that the motor 6 be rotated in the forward direction when a pulse is outputted to the pulse train signal while the sign signal is at a low level, and commands that the motor 6 be rotated in the reverse direction when a pulse is outputted to the pulse train signal while the sign signal is at a high level. Further, according to the negative logic type of the "CW+CCW pulse train" pulse form, the pulse form commands that the motor 6 be rotated in the forward direction when a pulse is outputted to the CCW signal while the CW signal is continually at a high level, and conversely commands that the motor 6 be rotated in the reverse direction when a pulse is outputted to the CW signal while the CCW signal is continuously at a high level.

The above-described counter 2 of the motor position controller 1 of this embodiment interprets the command pulse signals respectively corresponding to the above-described three types of pulse forms as well as the above-described positive logic and negative logic types. Then, the counter 2 gathers the command information including the rotational direction, number of revolutions, and rotational speed acquired when the pulse was counted in a predetermined time width, and generates and outputs the above-described position command signal to the motor controlling part 3.

The aforementioned three types of pulse forms are substantially not compatible with each other. As a result, the counter 2 which is capable of supporting all three types of pulse forms needs to specify the pulse form by which operation should be executed during operation. In response, according to this embodiment, the pulse form is specified to the counter 2 by a pulse form setting signal based on a manual setting made by a user, for example, via the parameter setting apparatus 8, which differs from the higher controller 5, prior to actual operation of the motor 6. The counter 2 uses the pulse form setting internally set based on the pulse form setting signal to interpret the two inputted command pulse signals and generate a position command signal.

Nevertheless, sometimes a pulse form related nonconformity occurs, such as a discrepancy between the pulse form setting inside the counter 2 and the pulse form of the two command pulse signals actually inputted, or incorrect transmission of the above-described two command pulse signals, resulting in transmission failure, due to some type of cause outside the motor position controller 1.

FIG. 3 is a table summarizing the above-described nonconformities that may occur taking into consideration the respective features of the three types of pulse forms. While descriptions have been omitted in the figure due to limited space, the nonconformities will now be described consecutively here.

In FIG. 3, first, one feature of the "sign+pulse train" setting when the pulse form setting inside the counter 2 is set to "sign+pulse train" is that the sign signal never changes alone. Therefore, when a state that departs from the above feature, such as a change only in the level of the sign signal but not in the level of the pulse train signal, is detected in the two command pulse signals actually inputted to the counter 2, the two command pulse signals are at least not of the form "sign+pulse train." As a result, detection of a state in which only the level of the sign signal but not the level of the pulse train signal changes serves as a condition for nonconformity detection. Then, the estimated state of nonconformity in a case where this condition for nonconformity detection is satisfied is presumably either input of command pulse signals of the "CW+CCW pulse train" pulse form to the counter 2, which is at variance with the pulse form setting, or a wiring error in which the sign signal and pulse train signal were connected in reverse.

Further, another feature of the "sign+pulse train" setting is that the sign signal never changes each time the pulse train signal changes by one pulse. Therefore, similar to the above, detection of a state that departs from this feature, i.e., detection of a state in which the change cycle of the sign signal level is less than the change cycle of the pulse train signal level (in other words, the change frequency of the sign signal is greater than or equal to the change frequency of the pulse train signal), serves as a condition for nonconformity detection. Then, the estimated state of nonconformity in a case where this condition for nonconformity detection is satisfied is presumably input of command pulse signals of the "two-phase pulse train with 90° phase differential" pulse form (abbreviated "phase A+phase B" in the table; hereinafter the same), which is at variance with the pulse form setting.

Furthermore, another feature of the "sign+pulse train" setting is that the change cycle of the sign signal is not very fast.

Therefore, similar to the above, detection of a state that departs from this feature, i.e., detection of a change cycle of the sign signal level that is less than or equal to a predetermined threshold value, serves as a condition for nonconformity detection. Then, the estimated state of nonconformity in a case where this condition for nonconformity detection is satisfied is presumably either input of command pulse signals of the "CW+CCW pulse train" or "two-phase with a 90° phase difference" pulse form at variance with the pulse form setting, or a wiring error in which the sign signal and pulse train signal were connected in reverse.

Further, another feature of the "sign+pulse train" setting is that the counter summed value always changes when a pulse is inputted to the pulse train signal. Therefore, similar to the above, detection of a state that departs from this feature, i.e., detection of a change in the counter summed value less than or equal to plus/minus one (detection of whether the change is one in the forward direction, one in the reverse direction, or no change at all; abbreviated as "counter 0" in the table; hereinafter the same) while either the sign signal level or the pulse train signal level is changed, serves as a condition for nonconformity detection. Then, the estimated state of nonconformity in a case where this detection condition is satisfied is presumably input of command pulse signals of the "two-phase pulse train with 90° phase differential" pulse form, which is at variance with the pulse form setting.

Next, one feature of the "CW+CCW pulse train" setting when the pulse form setting inside the counter 2 is set to "CW+CCW pulse train" is that the CW and CCW signals never change simultaneously. Therefore, detection of a state that departs from this feature in the two command pulse signals actually inputted to the counter 2, such as detection that both the CW signal and CCW signal change based on the identical change cycle, serves as a condition for nonconformity detection. Then, the estimated state of nonconformity in a case where this detection condition is satisfied is presumably input of a command pulse signal of the "two-phase pulse train with 90° phase differential" pulse form, which is at variance with the pulse form setting.

Further, another feature of the "CW+CCW pulse train" setting is that the counter summed value always changes when a CW signal and CCW signal pulse is inputted. Therefore, similar to the above, detection of a state that departs from this feature, i.e. detection of a state in which the change in the counter summed value is less than or equal to plus/minus one while either the CW signal level or CCW signal level is changed, serves as a condition for nonconformity detection. Then, the estimated state of nonconformity in a case where this detection condition is satisfied is presumably a state in which the pulse form setting of the counter 2 and the pulse form of the command pulse signals actually inputted are both the same "CW+CCW pulse train," but the logic thereof is reversed.

Next, one feature of the "two-phase pulse train with 90° phase differential" when the pulse form setting inside the counter 2 is set to "two-phase pulse train with 90° phase differential" is that both the phase A signal and the phase B signal change. Therefore, detection of a state that departs from this feature in the two command pulse signals actually inputted to the counter 2, such as detection of a change in one of the command pulse signal levels but not the other, serves as a condition for nonconformity detection. Then, the estimated state of nonconformity in a case where this detection condition is satisfied is presumably input of a command pulse signal of the "sign+pulse train" or "CW+CCW pulse train" pulse form, which is at variance with the pulse form setting.

Further, another feature of the "two-phase pulse train with 90° phase differential" setting is that the counter summed value always changes when the phase A signal and phase B signal are inputted at a 90° phase difference. Therefore, similar to the above, detection of a state that departs from this feature, i.e. detection of a state in which the change in the counter summed value is less than or equal to plus/minus one while one of the two command pulse signal levels is changed, serves as a condition for nonconformity detection. Then, the estimated state of nonconformity in a case where this detection condition is satisfied is presumably input of a command pulse signal of the "sign+pulse train" or "CW+CCW pulse train" pulse form, which is at variance with the pulse form setting.

Figure 4:
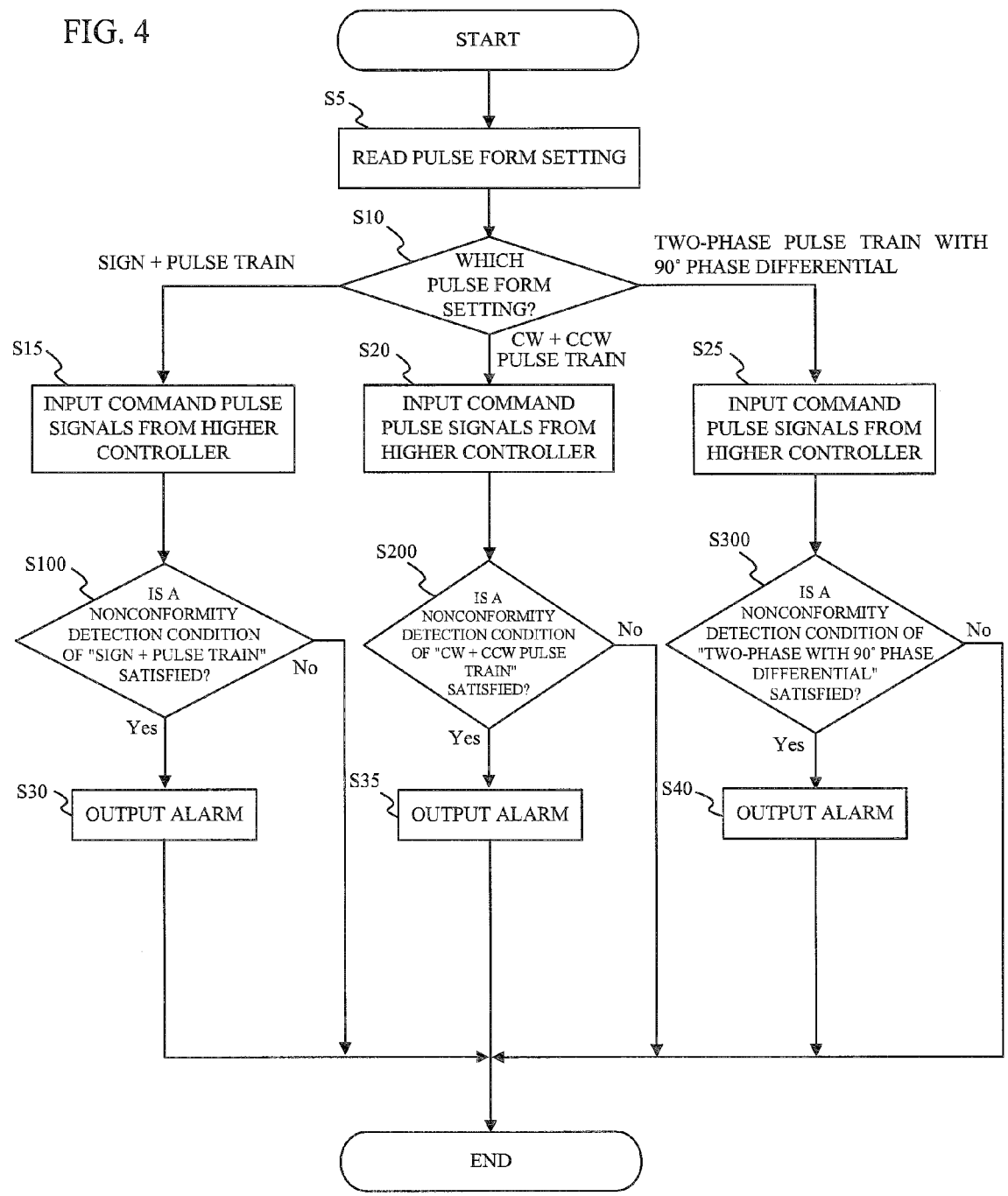
FIG. 4 is a flowchart illustrating the control procedure of the conformity determining part.

The above-described conformity determining part 4 of the motor position controller 1 of this embodiment determines occurrence of a pulse form related nonconformity corresponding to each of the pulse form settings using the "Conditions for nonconformity detection" in FIG. 3. FIG. 4 is a flowchart showing the control procedure executed by the conformity determining part 4 for making this determination. Note that the control procedure based on this flow is repeatedly executed in parallel by the conformity determining part 4 during states of normal operation in which the command pulse signals are inputted from the higher controller 5 to the motor position controller 1 to drive and control the motor 6.

First, in step S5, the conformity determining part 4 acquires the pulse form setting based on the pulse form setting signal via the parameter setting apparatus 8. This pulse form setting is the same as the pulse form setting inside the counter 2.

Subsequently, the flow proceeds to step S10 where the conformity determining part 4 determines the pulse form of the pulse form setting read in the above-described step S5, that is, determines whether the setting is the "sign+pulse train" setting, the "CW+CCW pulse train" setting, or the "two-phase pulse train with 90° phase differential" setting.

In step S10, when the setting is the "sign+pulse train" setting, the flow proceeds to step S15. In step S15, the two aforementioned command pulse signals are inputted from the higher controller 5, and the flow proceeds to step S100.

In step S100, the conformity determining part 4 determines conformity for the "sign+pulse train" pulse form setting. That is, the conformity determining part 4 determines whether or not one of the four conditions for nonconformity detection with the "sign+pulse train" pulse form setting of FIG. 3 described above is satisfied, i.e., a state in which only the level of the sign signal and not the level of the pulse train signal changes; a state in which the change cycle of the sign signal level is less than the change cycle of the pulse train signal level; a state in which the change cycle of the sign signal level is less than or equal to a predetermined threshold value; or a state in which the counter summed value is less than or equal to plus/minus one while either the sign signal level or the pulse train signal level is changed. If one of the conditions is satisfied, the decision is made that the condition of step S100 is satisfied and the flow proceeds to step S30 where the above-described alarm is outputted and the flow ends. When none of the above four conditions is satisfied, the decision is made that the condition of step S100 is not satisfied and the flow ends as is.

On the other hand, in step S10, when the pulse form setting is the "CW+CCW pulse train" setting, the flow proceeds to step S20. In step S20, the two above-described command pulse signals are inputted from the higher controller 5, and the flow proceeds to step S200.

In step S200, the conformity determining part 4 determines conformity for the "CW+CCW pulse train" pulse form setting. That is, the conformity determining part 4 determines whether or not one of the two conditions for nonconformity detection of the "CW+CCW pulse train" pulse form setting of FIG. 3 described above is satisfied, namely a state in which both the CW signal and the CCW signal change based on an identical change cycle; or a state in which the change in the counter summed value is less than or equal to plus/minus one while either the CW signal level or the CCW signal level is changed. If one of the conditions is satisfied, the decision is made that the condition of step S200 is satisfied and the flow proceeds to step S35 where the above-described alarm is outputted and then the flow ends. When neither of the two conditions is satisfied, the decision is made that condition of step S200 is not satisfied and the flow ends as is.

On the other hand, in step S10, when the pulse form setting is the "two-phase with a 90° phase difference" setting, the flow proceeds to step S25. In step S25, the two above-described command pulse signals are inputted from the higher controller 5, and the flow proceeds to step S300.

In step S300, the conformity determining part 4 determines conformity for the "two-phase pulse train with 90° phase differential" pulse form setting. That is, the conformity determining part 4 determines whether or not one of the two conditions for nonconformity detection of the "two-phase pulse train with 90° phase differential" pulse form setting of FIG. 3 described above is satisfied, namely a state in which the level of one command pulse signal but not the level of the other command pulse signals changes; or a state in which the change in the counter summed value is less than or equal to plus/minus one while one of the two command pulse signal levels is changed. If one of the conditions is satisfied, the decision is made that condition of step S300 is satisfied and the flow proceeds to step S40 where the above-described alarm is outputted and then the flow ends. When neither of the two conditions is satisfied, the decision is made that the condition of step S300 is not satisfied and the flow ends as is.

In the above, the procedures of step S30, step S35, and step S40 function as the alerting portion described in the claims.

As described above, in this embodiment, the conformity determining part 4 determines the conformity of the two command pulse signals and the pulse form setting, making it possible to specifically determine the nonconformity as a mismatch between the pulse form setting and the pulse form of the two command pulse signals actually inputted, transmission failure of the two command pulse signals, or the like, thereby enabling appropriate action in response to the details of that nonconformity. As a result, operation defects of the motor 6 caused by pulse form nonconformities can be avoided and reliable normal operation of the motor 6 can be achieved.

Further, in this embodiment in particular, the pulse form setting of the two command pulse signals is one of the "sign+pulse train" setting, "CW+CCW pulse train" setting, and "two-phase pulse train with 90° phase differential" setting, resulting in support of the three pulse forms generally used.

Further, in this embodiment in particular, the conformity determining part 4 outputs an alarm upon determination that the two command pulse signals and the pulse form setting do not match (=upon determination that a nonconformity condition is satisfied) in step S100, step S200, or step S300 in FIG. 4. With this arrangement, it is possible to alert the user to the occurrence of a pulse form related nonconformity.

Specifically, in a case where the pulse form setting is "sign+pulse train," the conformity determining part 4 determines in step S100 that the two command pulse signals and pulse form setting do not match when one of the following conditions is satisfied, and outputs an alarm in step S30: when only the sign signal level but not the pulse train signal level changes, when the change cycle of the sign signal level is less than the change cycle of the pulse train signal level, when the change cycle of the sign signal level is less than or equal to a predetermined threshold value, or when the change in the counter summed value is less than or equal to plus/minus one while either the sign signal level or the pulse train signal level is changed. With this arrangement, the conformity determining part 4 can clearly determine pulse form related nonconformities, such as a state of discrepancy in which the pulse form setting is "sign+pulse train" while the pulse form of the two command pulse signals actually inputted is one of the other "CW+CCW pulse train" or "two-phase pulse train with 90° phase differential" pulse forms, or transmission failure caused by a reversed wiring error of the sign signal and pulse train signal, for example.

Or, in a case where the pulse form setting is "CW+CCW pulse train," the conformity determining part 4 determines in step S200 that the two command pulse signals and pulse form setting do not match when one of the following conditions is satisfied, and outputs an alarm in step S35: when both the CW signal and the CCW signal change based on an identical change cycle, or when the change in the counter summed value is less than or equal to plus/minus one while either the CW signal level or the CCW signal level is changed. With this arrangement, the conformity determining part 4 can clearly determine pulse form related nonconformities, such as a state of discrepancy in which the pulse form setting is "CW+CCW pulse train" while the pulse form of the two command pulse signals actually inputted is the other "two-phase pulse train with 90° phase differential" pulse form, or a state of discrepancy in the logic of the "CW+CCW pulse train" form.

Or, in a case where the pulse form setting is "two-phase pulse train with 90° phase differential," the conformity determining part 4 determines in step S300 that the two command pulse signals do not match the pulse form setting when one of the following conditions is satisfied, and outputs an alarm in step S40: when the level of one command pulse signal but not the level of the other command pulse signal changes, or when the change in the counter summed value is less than or equal to plus/minus one while either of the two command pulse signal levels is changed. With this arrangement, the conformity determining part 4 can clearly determine pulse form related nonconformities, such as a state of discrepancy in which the pulse form setting is "two-phase pulse train with 90° phase differential" while the pulse form of the two command pulse signals actually inputted is one of the other "sign+pulse train" or "CW+CCW pulse train" pulse forms.

Note that the present aspect of the invention is not limited to the above-described embodiment, and various modifications may be made without deviating from the spirit and scope of the aspect of the invention. The following describes such modifications one by one.

That is, while in the above-described embodiment the conformity determining part 4 determines the conformity of the pulse form setting set inside the counter 2 in accordance with the pulse form setting signal inputted from an external source, and the two command pulse signals actually inputted, the present aspect of the invention is not limited thereto. For example, the motor position controller itself may automatically estimate the pulse form of the two command pulse signals actually inputted by consecutively switching and temporarily setting the plurality of pulse forms and determining the conformity thereof.

Figure 5:
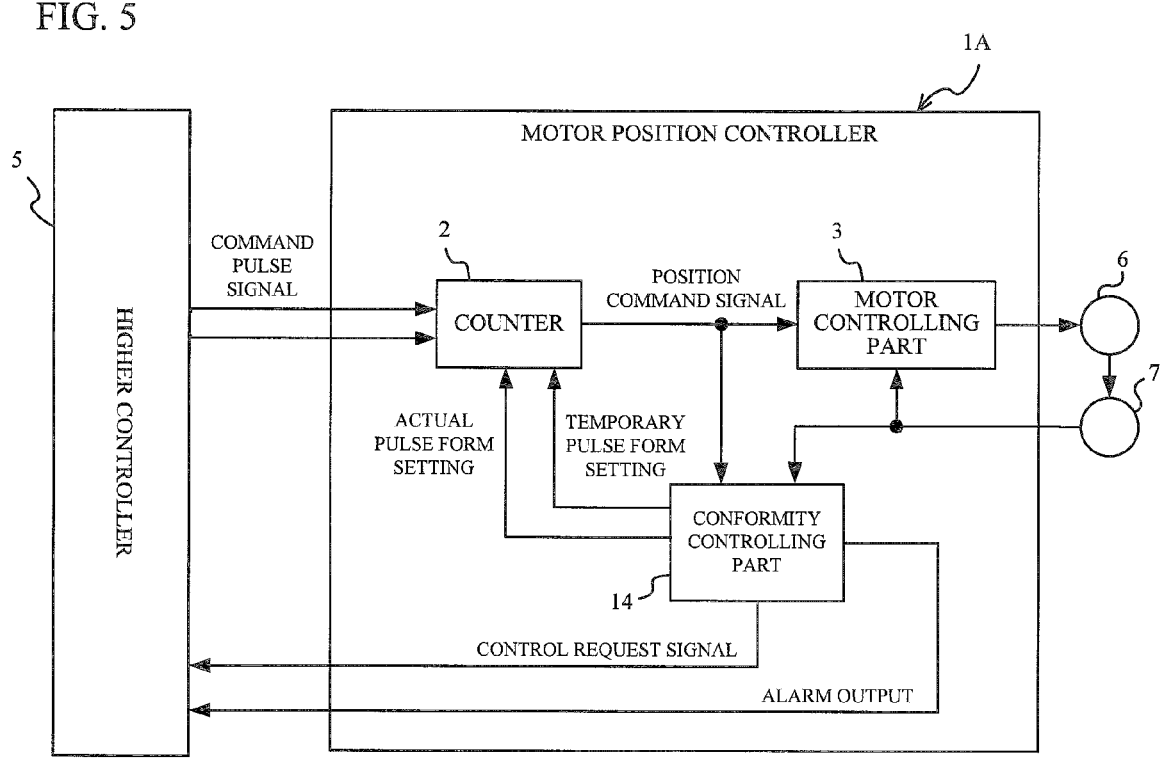
FIG. 5 is a system block diagram schematically illustrating the system configuration of the motor position controller and peripheral devices thereof in an exemplary modification in which the motor position controller automatically estimates the pulse form.

FIG. 5 is a system block diagram schematically showing the system configuration of the motor position controller and peripheral devices thereof according to such a modification, and corresponds to the above-described FIG. 1. Note that the same components as those in FIG. 1 are denoted using the same reference numerals, and descriptions thereof will be suitably omitted.

In FIG. 5, a motor position controller 1A is provided with a conformity controlling part 14 in place of the conformity determining part 4 provided to the motor position controller 1A. Two command pulse signals from the higher controller 5 and a pulse form temporary setting signal and actual setting signal (described in detail later) from the conformity controlling part 14 are inputted to the counter 2. Then, at least one of a position command signal from the counter 2 or motor position information detected by the rotary encoder 7 (in other words, information indicating the operating state of the motor) is inputted to the conformity controlling part 14. In addition, this conformity controlling part 14 outputs a control request signal (described in detail later) to the higher controller 5 in addition to the same alarm output as that of the conformity determining part 4 of the above-described embodiment. Note that, in this modification as well, the counter 2 supports the above-described three types of pulse forms "sign+pulse train," "CW+CCW pulse train," and "two-phase pulse train with 90° phase differential" as well as the positive logic and negative logic types of "sign+pulse train" and "CW+CCW pulse train."

In this modification, as described above, the above-described the above-described three types of pulse forms are consecutively switched and temporarily set in the counter 2, and conformity is determined based on the position command signal outputted by the counter 2 in accordance with that temporary setting, and according to the positive/negative state of the position command signal. Or, conformity is determined by actually operating the motor 6 using the position command signal outputted by the counter 2 in accordance with that temporary setting and determining whether or not that operation is the correct operation. The following describes an embodiment in which the motor 6 is actually operated. FIG. 6 is a table summarizing the actual operation of the motor 6 according to the pulse form of the two inputted command pulse signals when the above-described three types of pulse forms are each temporarily set as described above. Note that, in this example, the temporary setting of the pulse form setting is specifically the positive logic type. Further, in this example, reversed connection of the two command pulse signals is not considered. That is, the example is based under the premise that the sign signal and pulse train signal, the CW signal and CCW signal, and the phase A signal and phase B signal are each properly connected.

In FIG. 6, first, in a case where the pulse form setting inside the counter 2 is temporarily set to "sign+pulse train" (positive logic) and a "sign+pulse train" command pulse signal of the same positive logic is inputted, the pulse form (and logic type) is in a state of conformance, resulting in normal forward and reverse rotation of the motor 6. On the other hand, when a "sign+pulse train" command pulse signal of negative logic is inputted, the level of the sign signal indicates reverse rotation, and the change in the counter summed value is reversed. As a result, the forward rotation and reverse rotation of the motor 6 are switched so that the motor 6 rotates in reverse when instructed to rotate forward and rotates forward when instructed to rotate in reverse.

Further, in a case where the pulse form setting inside the counter 2 is temporarily set to "sign+pulse train" and a "CW+CCW pulse train" command pulse signal of positive or negative logic inputted, the pulse form is in a state of conformance only during the period when the pulse train is inputted to the pulse train signal side of the temporary setting. Therefore, the counter summed value increases or decreases in either the forward or reverse direction only. With this arrangement, the motor 6 operates in part in just one direction.

Further, in a case where the pulse form setting inside the counter 2 is temporarily set to "sign+pulse train" and "two-phase pulse train with 90° phase differential" command pulse signals are inputted, the motor 6 performs normal forward and reverse rotation.

Next, in a case where the pulse form setting inside the counter 2 is temporarily set to "CW+CCW pulse train" (positive logic) and a "sign+pulse train" command pulse signal of positive logic or negative logic is inputted, the pulse form is in a state of conformance only when and a pulse train of the pulse train signal is inputted to the CCW signal side with a forward rotation command or the CW signal side with a reverse rotation command in the temporary setting. Therefore, similar to the above, the counter summed value increases or decreases in either the forward or reverse direction only.

Further, in a case where the pulse form setting inside the counter 2 is temporarily set to "CW+CCW pulse train" and a "CW+CCW pulse train" command pulse signal of the same positive logic is inputted, the pulse form (and logic type) is in conformance, resulting in normal forward and reverse rotation of the motor 6. On the other hand, in a case where a "CW+CCW pulse train" command pulse signal of negative logic is inputted, the change in the counter summed value becomes less than or equal to plus/minus one. Therefore, the motor 6 becomes substantially inoperable for all practical purposes.

Further, in a case where the pulse form setting inside the counter 2 is temporarily set to "CW+CCW pulse train" and "two-phase pulse train with 90° phase differential" command pulse signals are inputted, the motor 6 performs normal forward and reverse rotation.

Next, in a case where the pulse form setting inside the counter 2 is temporarily set to "two-phase pulse train with 90° phase differential" and a "sign+pulse train" or "CW+CCW pulse train" command pulse signal of positive logic or negative logic is inputted, the change in the counter summed value becomes less than or equal to plus/minus one. Therefore, the motor 6 becomes substantially inoperable for all practical purposes. On the other hand, in a case where "two-phase pulse train with 90° phase differential" command pulse signals are inputted, the pulse form is in a state of conformance, resulting in normal forward and reverse rotation of the motor 6, similar to the above.

Figure 7:
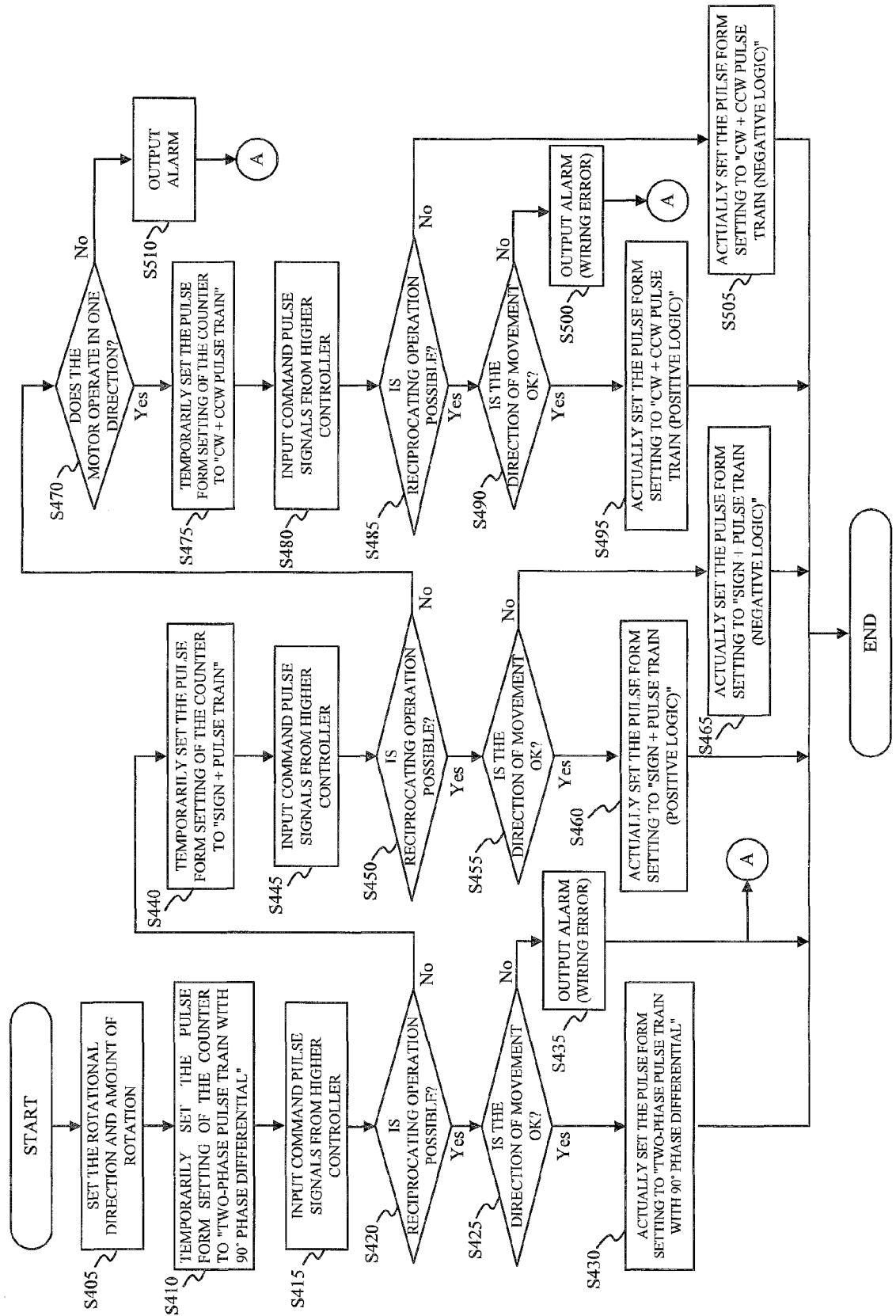
FIG. 7 is a flowchart illustrating the control procedure of the conformity determining part of an exemplary modification in which the motor position controller automatically estimates the pulse form.

The above-described conformity controlling part 14 of the motor position controller 1A of this modification switches the pulse form temporarily set in the pulse form setting of the counter 2 in a predetermined order, actually activates the motor 6, and determines the pulse form related nonconformity according to whether the motor operating state information from the rotary encoder 7 at that time reflects proper behavior, based on the phenomena of the aforementioned nonconformities. Then, with detection of the proper behavior of the motor operating state information, the conformity controlling part 14 properly estimates the pulse form of the two command pulse signals actually inputted. FIG. 7 is a flowchart showing the control procedure executed by the conformity controlling part 14 for executing such a function. Note that the control procedure based on this flow is executed only once by the conformity controlling part 14, before the motor position controller 1 starts normal operation.

In FIG. 7, first, in step S405, the conformity controlling part 14 sets the rotational direction and rotation value of the motor 6 to be used during trial runs for conformity determination. Note that the rotational direction sets whether rotation is to first be implemented in the forward or reverse direction in the reciprocating operation in step S420 described later.

Subsequently, the flow proceeds to step S410 where the conformity controlling part 14 generates and outputs to the counter 2 an instruction signal for temporarily setting the pulse form setting of the counter 2 first to "two-phase pulse train with 90° phase differential." The counter 2 internally sets the temporary setting (temporarily sets the setting) so that the command pulse signals are interpreted in accordance with the "two-phase pulse train with 90° phase differential" pulse form, based on this inputted temporary setting instruction signal.

Then, the flow proceeds to step S415 where the conformity controlling part 14 outputs a control request signal to the higher controller 5 so that the command pulse signals are outputted from the higher controller 5 based on the rotational direction and rotation value set in the above-described step S405. With this arrangement, two command pulse signals of an unknown pulse form outputted from the higher controller 5 are inputted to the counter 2. The counter 2 counts the number of pulses included in the command pulse signals by applying the above-described internally temporarily set pulse form setting to the inputted command pulse signals and interpreting the results, and then generates and outputs a position command signal (=temporary position command signal) corresponding to the count contents to the motor controlling part 3. With this arrangement, the motor controlling part 3 controls the drive of the motor 6, causing the motor 6 to operate (or not operate as previously described) in accordance with the above-described position command signal. As a result, the above-described temporary position command signal from the counter 2 is outputted to the conformity controlling part 14, and the motor operating state information corresponding to the operation of the motor 6 is outputted from the above-described rotary encoder 7 to the conformity controlling part 14.

Subsequently, the flow proceeds to step S420 where the conformity controlling part 14 determines whether or not the motor 6 operated properly based on the motor operating state information from the rotary encoder 7 inputted in the above-described step S415. Here, the example employed is a case where the motor 6 is reciprocally operated by forward rotation and reverse rotation, and thus whether or not the motor 6 performed the reciprocating operation is determined in this step S420. In a case where the motor 6 performed the reciprocating operation, the decision is made that the condition of step S420 is satisfied and the flow proceeds to step S425.

In step S425, whether or not the reciprocating operation of the motor 6 was executed is determined in the correct order. That is, as described above with reference to FIG. 6, the forward and reverse operation of the motor 6 is sometimes performed with the forward rotation and reverse rotation executed in reverse. In this step S425, whether or not the order of the rotational direction in the reciprocating operation of the motor 6 was correct is determined.

In a case where the reciprocating operation was performed in the correct order, the decision is made that the condition is satisfied in step S425. In this case, it is estimated that the pulse form of the two command pulse signals inputted from the higher controller 5 to the counter 2 is "two-phase pulse train with 90° phase differential" (that the pulse form is in a state of conformance) based on the above-described control request signal. Then, the flow proceeds to step S430.

In step S430, the conformity controlling part 14 generates and outputs to the counter 2 an instruction signal for firmly setting (actually setting) the pulse form setting of the counter 2 to "two-phase pulse train with 90° phase differential." The counter 2 then ultimately sets the setting so that the command pulse signals are interpreted in accordance with "two-phase pulse train with 90° phase differential," based on this inputted actual setting instruction signal. Then, the flow ends.

On the other hand, in a case where the reciprocating operation was performed in the incorrect order, the decision is made in the determination of the above-described step S425 that the condition of step S425 is not satisfied. In such a case, it is estimated that the pulse form of the two command pulse signals is "two-phase pulse train with 90° phase differential," but a wiring error caused by reverse connection occurred. In response, in step S435, the conformity controlling part 14 outputs a corresponding alarm to the higher controller 5. With this arrangement, similar to the above-described embodiment, the higher controller 5 outputs a control signal to suitable alerting portion (not shown), and the alerting portion alerts the user accordingly. Note that the conformity controlling part 14 may output an alarm to alerting portion provided inside the motor position controller 1, and the alerting portion may alert the user accordingly. Subsequently, the flow ends.

Further, in a case where the reciprocating operation was not performed, the decision is made in the determination of the above-described step S420 that the condition is not satisfied. In such a case, it is estimated that the pulse form of the two command pulse signals is not "two-phase pulse train with 90° phase differential," and the flow proceeds to step S440.

In step S440, the conformity controlling part 14 generates and outputs to the counter 2 an instruction signal for temporarily setting the pulse form setting of the counter 2 to the next pulse form, "sign+pulse train" of positive logic. The counter 2 internally temporarily sets the setting so that the command pulse signals are interpreted in accordance with the "sign+pulse train" pulse form, based on this inputted temporary setting instruction signal.

Then, the flow proceeds to step S455 where, similar to the above-described step S415, the conformity controlling part 14 outputs a control request signal. With this arrangement, the two command pulse signals of an unknown pulse form are inputted from the higher controller 5 to the counter 2.

Subsequently, the flow proceeds to step S450 where the conformity controlling part 14, similar to the above-described step S420, determines whether or not the motor 6 performed a reciprocating operation. In a case where the motor 6 performed a reciprocating operation, the decision is made that the condition of step S450 is satisfied and the flow proceeds to step S455.

In step S455, similar to the above-described step S425, the conformity controlling part 14 determines whether or not the reciprocating operation of the motor 6 was executed in the correct order. In a case where the reciprocating operation was performed in the correct order, the decision is made that the condition of step S455 is satisfied, and it is estimated that the pulse form of the two command pulse signals is "sign+pulse train" of positive logic.

Then, in step S460, the conformity controlling part 14, similar to the above-described step S430, outputs to the counter 2 an instruction signal for actually setting the pulse form setting to "sign+pulse train" of positive logic. The counter 2 then ultimately sets the setting so that the command pulse signals are interpreted in accordance with "sign+pulse train" of positive logic, based on this actual setting instruction signal. Then, the flow ends.

On the other hand, in a case where the reciprocating operation was performed in the correct order, the decision is made in the determination of the above-described step S455 that the condition of step S455 is not satisfied. In such a case, it is estimated that the pulse form of the two command pulse signals is "sign+pulse train" with the logic reversed. In response, in step S465, the conformity controlling part 14 outputs to the counter 2 an instruction signal for actually setting the pulse form setting to "sign+pulse train" of negative logic. The counter 2 then ultimately sets the setting so that the command pulse signals are interpreted in accordance with "sign+pulse train" of negative logic, based on this actual setting instruction signal. Then, the flow ends.

Further, in a case where the reciprocating operation was not performed, the decision is made in the determination of the above-described step S450 that the condition is not satisfied. In such a case, it is estimated that the pulse form of the two command pulse signals is a form other than "two-phase pulse train with 90° phase differential" and "sign+pulse train," and the flow proceeds to step S470.

In step S470, whether or not the motor 6 operated in only one rotational direction is determined in the determination of the above-described step S450. As described above, the example employed is a case where the motor 6 executes a reciprocating operation in the forward and reverse directions and thus, in this step S470, whether or not the motor 6 rotated in only one direction (without reciprocating) is determined. In a case where the motor 6 rotated in only one direction, the decision is made that the condition of step S470 is satisfied, and it is estimated that the pulse form of the two command pulse signals is "CW+CCW pulse train." Note that this estimation is based on the fact that counting is performed in only one direction regardless of the logic by which the "CW+CCW pulse train" command pulse signals were inputted when the pulse form setting was "sign+pulse train" in the above-described FIG. 6. Subsequently, the flow proceeds to step S475.

In step S475, the conformity controlling part 14 generates and outputs to the counter 2 an instruction signal for temporarily setting the pulse form setting of the counter 2 to the next pulse form, "CW+CCW pulse train" of positive logic. The counter 2 internally sets the temporary setting so that the command pulse signals are interpreted in accordance with the "CW+CCW pulse train" pulse form, based on this inputted temporary setting instruction signal.

Then, the flow proceeds to step S480 where, similar to the above-described steps S415 and S455, the conformity controlling part 14 outputs a control request signal. With this arrangement, the two command pulse signals of an unknown pulse form are inputted from the higher controller 5 to the counter 2.

Subsequently, the flow proceeds to step S485 where the conformity controlling part 14, similar to the above-described steps S420 and S450, determines whether or not the motor 6 performed a reciprocating operation. In a case where the motor 6 performed a reciprocating operation, the decision is made that the condition of step S485 is satisfied and the flow proceeds to step S490.

In step S490, similar to the above-described steps S425 and S455, the conformity controlling part 14 determines whether or not the reciprocating operation of the motor 6 was executed in the correct order. In a case where the reciprocating operation was performed in the correct order, the decision is made that the condition of step S490 is satisfied, and it is estimated that the pulse form of the two command pulse signals is "CW+CCW pulse train" of positive logic.

Then, in step S495, the conformity controlling part 14, similar to the above-described steps S430 and S460, outputs to the counter 2 an instruction signal for actually setting the pulse form setting to "CW+CCW pulse train" of positive logic. The counter 2 then ultimately sets the setting so that the command pulse signals are interpreted in accordance with "CW+CCW pulse train" of positive logic, based on this actual setting instruction signal. Then, the flow ends.

On the other hand, in a case where the reciprocating operation is performed in the incorrect order in the determination of the above-described step S490, the decision is made that the condition of step S490 is not satisfied. In such a case, it is estimated that a wiring error, such as interference, has occurred. In response, in step S500, the conformity controlling part 14 outputs a corresponding alarm to the higher controller 5. As a result, similar to the above, either alerting portion alerts the user accordingly based on the control of the higher controller 5, or alerting portion provided inside the motor position controller 1 alerts the user accordingly. Subsequently, the flow ends.

Further, in a case where the reciprocating operation was not performed in the determination of the above-described step S485, the decision is made that the condition is not satisfied. In such a case, it is estimated that the pulse form of the two command pulse signals is "CW+CCW pulse train" with the logic reversed. In response, in step S505, the conformity controlling part 14 outputs to the counter 2 an instruction signal for actually setting the pulse form setting to "CW+CCW pulse train" of negative logic. The counter 2 then ultimately sets the setting so that the command pulse signals are interpreted in accordance with "CW+CCW pulse train" of negative logic, based on this actual setting instruction signal. Subsequently, the flow ends.

Further, in a case where the motor 6 did not operate in either of the rotational directions in the determination of the above-described step S470, the decision is made that the condition of step S470 is not satisfied. In such a case, it is estimated that a wiring error, such as disconnection or interference, occurred, or that the pulse form of the inputted command pulse signals is a form other than "sign+pulse train," "CW+CCW pulse train," and "two-phase pulse train with 90° phase differential." In such a case, in step S510, the conformity controlling part 14 outputs a corresponding alarm to the higher controller 5. As a result, similar to the above, either alerting portion alerts the user accordingly based on the control of the higher controller 5, or alerting portion provided inside the motor position controller 1 alerts the user accordingly. Then, the flow ends.

In the above, the procedures of step S410, step S440, and step 475 in the flow in the above-described FIG. 7 function as the temporary setting portion described in the claims. Further, the procedures of step S420, step S425, step S450, step S455, step S470, step S485, and step S490 function as the second conformity determination portion. Further, the procedures of step S430, step S460, step S465, step S495, and step S505 function as the determining portion.

As described above, in this modification, the conformity controlling part 14 consecutively switches and temporarily sets a plurality of pulse forms in the procedures of step S410, step S440, and step S475 in FIG. 7, making it possible for the motor position controller 1A itself to automatically run a plurality of pulse form trials without depending on an external input. Then, at this time, in the procedures of step S420, step S425, step S450, step S455, step S470, step S485, and step S490, the conformity of the temporarily set pulse form and actually inputted two command pulse signals is determined via the operating behavior of the motor 6.

Specifically, the conformity controlling part 14 refers to the operating form of the motor 6 when the pulse form temporarily set at that moment is applied, based on the motor operating state information from the rotary encoder 7. With this arrangement, the pulse form of the two command pulse signals actually inputted is estimated with higher accuracy. As a result, similar to the above-described embodiment, it is possible to specifically determine the nonconformity, such as a mismatch between the pulse form setting and the pulse form of the two command pulse signals actually inputted, or transmission failure of the two command pulse signals, making it possible to take appropriate action in accordance with the contents of that nonconformity. That is, in a case where there is conformity between the pulse form setting temporarily set at that moment and the two command pulse signals actually inputted, that pulse form is determined to be the pulse form setting for ultimately driving the motor 6 and is applied to the counter 2. With this arrangement, the motor position controller 1A itself is capable of automatically concluding the correct pulse form setting without depending on an input from an external source. As a result, operation defects of the motor 6 caused by pulse form nonconformities can be avoided and reliable normal operation of the motor 6 can be achieved.

Further, in this modification in particular, similar to the above-described embodiment, the pulse form setting of the two command pulse signals is one of the "sign+pulse train," "CW+CCW pulse train," or "two-phase pulse train with 90° phase differential" settings, permitting support of the three pulse forms generally used.

Note that while the above has been described in connection with an illustrative scenario in which the motor subject to driving and control is a rotary motor, the present aspect of the invention is not limited thereto. That is, although not particularly shown, the present aspect of the invention can be applied to a case where a direct acting type motor (so called linear motor) is driven and controlled. In such a case, while the above-described rotary encoder 7 cannot be used, the same advantages as those described above can be achieved by using a detector capable of detecting the same motor operating state information. At this time, the rotation direction, rotation value, and rotational speed in the above are replaced with the direction of movement, amount of movement (movement position), and movement speed of the moving element, respectively. Further, while the above has been described in connection with an illustrative scenario in which a pulse form made of two command pulse signals is used, the present aspect of the invention is not limited thereto. That is, although not particularly shown, the present aspect of the invention may be applied to a case where a pulse form made of one command pulse signal or three or more command pulse signals is used. In such a case, the same advantages as those described above can be achieved by using a technique of conformity determination that corresponds to each of the pulse forms. Further, when the conformity controlling part 14 of the motor position controller 1A outputs an alarm, the alarm may be directly outputted to a dedicated display device without passing through the higher controller 5.

Further, in addition to the examples described above, the techniques of the above-described embodiment and exemplary modifications may be suitably combined as well.

Although other examples are not individually described herein, various changes and modifications can be made without departing from the spirit and scope of the aspect of the invention.

What is claimed is:

1. A motor position controller that inputs command pulse signals that include a first pulse signal and a second pulse signal, each of the pulse signals having change strokes different from each other, and drives a motor based on said command pulse signals, comprising:
    a pulse form setting signal input portion configured to input a pulse form setting signal that clearly indicates a pulse form of the command pulse signals inputted;
    a pulse form setting determining portion configured to determine the pulse form by which the command pulse signals are to be interrupted as a pulse form setting, based on the pulse form setting signal inputted by said pulse form setting signal input portion;
    a position command generating device configured to generate a position command signal from said command pulse signals in accordance with the pulse form setting determined by said pulse form setting determining portion;
    a motor controlling part configured to supply power to said motor based on said position command signal; and
    a first conformity determination device configured to determine the conformity of said pulse form setting determined by said pulse form setting determining portion and said command pulse signals.

2. The motor position controller according to claim 1, further comprising alerting portion that outputs an alarm signal in a case where said first conformity determination device determines that said command pulse signals and said pulse form setting are not in conformance.

3. The motor position controller according to claim 2, wherein:
    said first and second pulse signals are any one of the following signal forms of (A) to (C):
        (A) said first pulse signal is a sign signal that determines a rotational direction of the motor, and said second pulse signal is a pulse train signal that determines a rotation value and a rotational speed of the motor;
        (B) said first pulse signal is a CCW signal that determines a rotation value and a rotational speed in a forward direction of the motor, and said second pulse signal is a CW signal that determines a rotation value and a rotational speed in a reverse direction of the motor; or
        (C) said first pulse signal and said second pulse signal are pulse signals of an identical waveform having a predetermined phase difference, with the form of the phase difference determining a rotational direction of the motor, and a number of pulses determining a rotation value and a rotational speed of the motor; and
    said pulse form setting is any one of a "sign+pulse train" setting corresponding to the form of (A), a "CW+CCW pulse train" setting corresponding to the form of (B), and a "two-phase pulse train with 90° phase differential" setting corresponding to the form of (C).

4. The motor position controller according to claim 3, wherein:
    said first conformity determination device, in a case where said pulse form setting is set to "sign+pulse train," determines that said first and second pulse signals and said pulse form setting are not in conformance when any one of the following conditions is satisfied: when only a level of said sign signal changes and a level of said pulse train signal does not change; when a change cycle of a level of said sign signal is less than a change cycle of a level of said pulse train signal; when a change cycle of a level of said sign signal is less than or equal to a predetermined threshold value; or when a change in a counter summed value of said position command generating device is less than or equal to plus/minus one while either a level of said sign signal or a level of said pulse train signal is changed.

5. The motor position controller according to claim 3, wherein:
said first conformity determination device, in a case where said pulse form setting is set to "CW+CCW pulse train," determines that said first and second pulse signals and said pulse form setting are not in conformance when one of the following conditions is satisfied: when both said CW signal and said CCW signal change based on an identical change cycle; or when a change in a counter summed value of said position command generating device is less than or equal to plus/minus one while either a level of said CW signal or a level of said CCW signal is changed.

6. The motor position controller according to claim 3, wherein:
said first conformity determination device, in a case where said pulse form setting is set to "two-phase pulse train with 90° phase differential," determines that said first and second pulse signals and said pulse form setting are not in conformance when one of the following conditions is satisfied: when only a level of one pulse signal changes and a level of the other pulse signal does not change; or when a change in a counter summed value of said position command generating device is less than or equal to plus/minus one while a level of any one of the two pulse signals is changed.

7. The motor position controller according to claim 1, wherein the position command generating device is configured to generate the position command signal from both of said first pulse signal and said second pulse signal in accordance with the pulse form setting in order to control said motor.

8. A motor position controller that inputs command pulse signals that include a first pulse signal and a second pulse signal, each of the pulse signals having change strokes different from each other, and drives a motor based on said command pulse signals, comprising:
means for inputting a pulse form setting signal that clearly indicates a pulse form of the command pulse signals inputted;
means for determining the pulse form by which the command pulse signals are to be interrupted as a pulse form setting, based on the pulse form setting signal inputted by said means for inputting a pulse form setting signal;
means for generating a position command signal from said command pulse signals in accordance with the pulse form setting determined by said means for determining the pulse form;
motor controlling means configured to supply power to said motor based on said position command signal; and
means for determining the conformity of said pulse form setting determined by said means for determining the pulse form and said command pulse signals.

9. The motor position controller according to claim 8, wherein the means for generating the position command signal from both of said first pulse signal and said second pulse signal in accordance with the pulse form setting in order to control said motor.

10. A motor position controller that inputs a command pulse signal and a desired pulse form setting, and drives a motor based on said command pulse signal, comprising:

a position command generating device configured to generate a position command signal from said command pulse signal in accordance with the inputted desired pulse form setting;
a motor controlling part configured to supply power to said motor based on said position command signal;
a first conformity determination device configured to determine the conformity of said desired pulse form setting and said command pulse signal; and
an alerting portion that outputs an alarm signal in a case where said first conformity determination device determines that said command pulse signal and said pulse form setting are not in conformance, wherein:
said command pulse signal inputted by said position command generating device includes a first pulse signal and a second pulse signal that differ from each other, where said first and second pulse signals are any one of the following signal forms of (A) to (C):
  (A) said first pulse signal is a sign signal that determines a rotational direction of the motor, and said second pulse signal is a pulse train signal that determines a rotation value and a rotational speed of the motor;
  (B) said first pulse signal is a CCW signal that determines a rotation value and a rotational speed in a forward direction of the motor, and said second pulse signal is a CW signal that determines a rotation value and a rotational speed in a reverse direction of the motor; or
  (C) said first pulse signal and said second pulse signal are pulse signals of an identical waveform having a predetermined phase difference, with the form of the phase difference determining a rotational direction of the motor, and a number of pulses determining a rotation value and a rotational speed of the motor; and
said pulse form setting inputted by said position command generating device is any one of a "sign+pulse train" setting corresponding to the form of (A), a "CW+CCW pulse train" setting corresponding to the form of (B), and a "two-phase pulse train with 90° phase differential" setting corresponding to the form of (C).

11. The motor position controller according to claim 10, wherein:
said first conformity determination device, in a case where said pulse form setting is set to "sign+pulse train," determines that said first and second pulse signals and pulse form setting are not in conformance when any one of the following conditions is satisfied: when only a level of said sign signal changes and a level of said pulse train signal does not change; when a change cycle of a level of said sign signal is less than a change cycle of a level of said pulse train signal; when a change cycle of a level of said sign signal is less than or equal to a predetermined threshold value; or when a change in a counter summed value of said position command generating device is less than or equal to plus/minus one while either a level of said sign signal or a level of said pulse train signal is changed.

12. The motor position controller according to claim 10, wherein:
said first conformity determination device, in a case where said pulse form setting is set to "CW+CCW pulse train," determines that said first and second pulse signals and said pulse form setting are not in conformance when one of the following conditions is satisfied: when both said CW signal and said CCW signal change based on an identical change cycle; or when a change in a counter summed value of said position command generating device is less than or equal to plus/minus one while either a level of said CW signal or a level of said CCW signal is changed.

13. The motor position controller according to claim 10, wherein:
    said first conformity determination device, in a case where said pulse form setting is set to "two-phase pulse train with 90° phase differential," determines that said first and second pulse signals and said pulse form setting are not in conformance when one of the following conditions is satisfied: when only a level of one pulse signal changes and a level of the other pulse signal does not change; or when a change in a counter summed value of said position command generating device is less than or equal to plus/minus one while a level of any one of the two pulse signals is changed.

* * * * *